M. BIRKIGT.
JOINT.
APPLICATION FILED JAN. 8, 1916.

1,207,478. Patented Dec. 5, 1916.

Witnesses
Norris L. Sumby.

Inventor
Marc Birkigt
by James L. Norris,
Attorney.

UNITED STATES PATENT OFFICE.

MARC BIRKIGT, OF BOIS-COLOMBES, FRANCE.

JOINT.

1,207,478.   Specification of Letters Patent.   Patented Dec. 5, 1916.

Application filed January 8, 1916. Serial No. 71,084.

*To all whom it may concern:*

Be it known that I, MARC BIRKIGT, engineer, citizen of the Republic of Switzerland, residing at Bois-Colombes, Department of Seine, France, have invented certain new and useful Improvements in Joints, of which the following is a specification.

The invention relates to joints between two parts and having a third part passing right through the two former parts, and it relates more particularly to the joints for sparking plugs in engines with an independent jacket secured to the cylinders.

The invention has for its object to enable joints of the above mentioned kind to be made so that they are of greater simplicity and efficiency than hitherto.

The invention comprises a screwed fluid-tight joint between two parts in which the hole provided in one of the elements is partly screw-threaded so as to enable another element to be screwed into it, a ring of soft metal being introduced into the part of the hole which is not screw-threaded so that it should cover the joint of the two parts, the said ring being arranged so that when the last mentioned element is screwed into place, the said ring will be squeezed between the said element and the wall of the hole.

The invention further comprises certain other arrangements more explicitly referred to in the following description.

A construction of this invention is illustrated in the accompanying drawing, in which—

Figure 1:
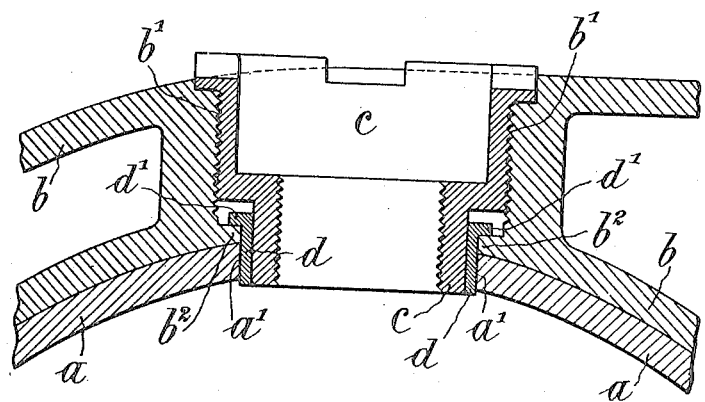
Figure 2:
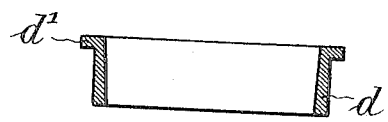

Figure 1 shows in section a part of a cylinder of an explosion engine perpendicular to its axis, with a jacket independent of the cylinder, at the point where the sparking plug is secured to the cylinder. Fig. 2 shows in axial section the ring covering the joint.

In the cylinder $a$ is made a hole $a^1$, and in the cylinder jacket $b$ a hole $b^1$ of a diameter slightly larger than that of the hole $a^1$, an inner flange $b^2$ of the same inside diameter as the hole $a^1$ being left at that end of the hole $b^1$ which is at the side of the cylinder $a$. The hole $b^1$ is tapped to within a small distance from the flange $b^2$. A hollow plug $c$ is provided and in which a sparking plug, or the like, may be removably mounted. The said part $c$ is given, on a portion of its length, an outside diameter equal to the inside diameter of the hole $b^1$, and on the rest of its length, an outside diameter slightly smaller than the inside diameter of the hole $a^1$. The part of larger diameter of the said part $c$ is screw-threaded so as to enable it to be screwed into the tapped portion of the hole $b^1$. Finally a ring or sleeve $d$ made of soft metal, such as copper or aluminium, is given an outside diameter equal to the diameter of the hole $a^1$, and an inside diameter slightly smaller than that of the reduced portion of the part $c$; the inner wall of the ring being preferably given a slightly conical shape. The said ring is finally provided with an outside flange $d^1$ at the side at which is situated the largest base of the truncated cone in the case when its inner surface is conical. Owing to which, as will be readily understood, it is only necessary before putting in place the part $c$ carrying the plug, to introduce the ring $d$ into the hole $a^1$ so that it should cover the joint between the parts $a$ and $b$. The ring $d$ is prevented from completely passing through the hole $a^1$ owing to its flange $d^1$ which engages with the flange $b^2$. The part $c$ is then screwed into the hole $b^1$, and the said part squeezes the ring $d$ between itself and the wall of the hole $a^1$ and of the flange $b^2$, which insures a perfectly tight joint.

Obviously the invention is not limited to the construction described, but comprises any modification within the scope of the claims.

Having now particularly described and ascertained the nature of my said invention and in what manner the same is to be performed, I declare that what I claim is:—

1. As a new article of manufacture, a joint connection for two juxtaposed parts having registering apertures therein forming an opening enlarged and threaded at a point beyond the joint of said two parts, said connection comprising a member having a tapering bore therein and adapted to cover the joint of said parts, a plug to be threaded in the enlarged portion of said opening and having an extension to engage with the wall of tapering bore of said member, whereby the latter is forced against the wall of said opening to seal said joint as the plug is screwed in position.

2. In a joint, the combination of two substantially juxtaposed parts, each having an aperture registering with the other to form an opening through said parts, said opening being enlarged and threaded at one end thereof and at a point beyond the joint of said two parts, a sleeve disposed in said opening and arranged to cover the joint of said two parts, a projection on said sleeve to engage with the shoulder in the opening formed by the enlargement of the latter, and a plug threaded in the enlarged portion of the opening and having an extension adapted to project through and engage said sleeve for pressing the same against the wall of said opening to seal said joint as the plug is screwed in position.

3. In a joint, the combination of two substantially juxtaposed parts each having an aperture registering with the other to form an opening through said parts, said opening being enlarged and threaded at one end thereof and at a point beyond the joint of said two parts, a member having a tapering bore therein and arranged to cover the joint of said two parts, a plug threaded in the enlarged portion of the opening and having an extension to engage with the walls of the tapering bore of said member, whereby the latter is forced against the wall of said opening to seal said joint as the plug is screwed in position.

4. In a joint, the combination of two substantially juxtaposed parts each having an aperture therein of different diameters and arranged to register with each other, an internal annular flange formed on the part having the larger aperture and adapted to overlie in juxta-relation the shoulder provided by the part having the smaller aperture, a ring member disposed in the reduced portion of the opening formed by said apertures to cover the joint between said two parts, a projection extending from the ring to engage with said flange for retaining the ring in position, and a plug threaded in the larger aperture and having an extension adapted to project through and engage said ring for forcing the latter against the wall of said opening to seal said joint as the plug is screwed in position.

In testimony whereof I have hereunto set my hand in presence of two subscribing witnesses.

MARC BIRKIGT.

Witnesses:
CHAS. P. PRESSLY,
PAUL NEW.

Copies of this patent may be obtained for five cents each, by addressing the "Commissioner of Patents, Washington, D. C."